United States Patent [19]

Wertz

[11] Patent Number: 5,528,502
[45] Date of Patent: Jun. 18, 1996

[54] SATELLITE ORBIT MAINTENANCE SYSTEM

[75] Inventor: James R. Wertz, Torrance, Calif.

[73] Assignee: Microcosm, Inc., Torrance, Calif.

[21] Appl. No.: 890,368

[22] Filed: May 26, 1992

Related U.S. Application Data

[63] Continuation of Ser. No. 571,508, Aug. 22, 1990, abandoned.

[51] Int. Cl.$^6$ .............................. G06G 7/78; B64G 1/24; B64G 1/28
[52] U.S. Cl. ............... 364/459; 364/453; 364/434; 364/476; 364/455; 244/164; 244/165; 244/169; 244/158 R; 342/352; 342/354; 342/355
[58] Field of Search ............... 244/164, 169, 244/171, 165, 166, 176, 170, 158 R, 167; 364/459, 434, 433, 455, 453, 460, 476; 342/352, 354, 355

[56] References Cited

U.S. PATENT DOCUMENTS

| | | | |
|---|---|---|---|
| 3,866,025 | 2/1975 | Cavanagh | 244/169 X |
| 3,944,172 | 3/1976 | Becker | 244/169 |
| 4,102,958 | 7/1978 | Wertz | 264/40.6 |
| 4,161,780 | 7/1979 | Rudolph et al. | 364/434 |
| 4,288,051 | 9/1981 | Goschel | 244/164 |
| 4,358,076 | 11/1982 | Lange et al. | 244/164 |
| 4,599,697 | 7/1986 | Chan et al. | 364/434 |
| 4,617,634 | 10/1986 | Izumida et al. | 364/455 |
| 4,730,798 | 3/1988 | Wertz | 244/171 |
| 4,776,540 | 10/1988 | Westerlund | 244/164 |
| 4,837,699 | 6/1989 | Smay et al. | 364/459 |
| 4,911,385 | 3/1990 | Agrawal et al. | 244/165 |
| 4,958,788 | 9/1990 | Namera et al. | 244/169 |
| 5,050,087 | 9/1991 | Walrath et al. | 364/434 |
| 5,054,719 | 10/1991 | Maute | 244/164 |
| 5,109,346 | 4/1992 | Wertz | 364/459 |
| 5,132,910 | 7/1992 | Scheit et al. | 364/459 |
| 5,163,641 | 11/1992 | Yasaka | 244/164 |
| 5,222,023 | 6/1993 | Liu et al. | 364/459 |
| 5,227,802 | 7/1993 | Pullman et al. | 342/352 |
| 5,267,167 | 11/1993 | Glickman | 364/459 |
| 5,279,483 | 1/1994 | Blancke et al. | 364/434 |
| 5,326,054 | 7/1994 | Turner | 244/158 R |

*Primary Examiner*—Kevin J. Teska
*Assistant Examiner*—Jacques H. Louis-Jacques
*Attorney, Agent, or Firm*—Noel F. Heal

[57] ABSTRACT

A technique for maintaining a satellite in an assigned orbit without control or intervention from the ground. Autonomously obtained navigational data provide a measurement of the actual orbit in which the satellite is traveling. So long as the measured orbit conforms to a desired orbit to within a preselected tolerance, periodic corrections of equal magnitude are made to the satellite's velocity, based on a prediction of the effect of atmospheric drag on the orbit. Measurement of the orbit is made by observation of the time that the satellite passes a reference point in the orbit, such as by crossing the ascending node. If the measured orbit departs from the desired orbit by more than the preselected tolerance, a velocity correction of a magnitude different from the one based on prediction is applied to the satellite. For a decaying orbit, the magnitude of the velocity correction is increased above the correction value based on prediction. For a rising orbit, the magnitude of the velocity correction is decreased below the value based on prediction, and may be reduced to zero, allowing atmospheric drag to bring the measured orbit back within the preselected tolerance range.

20 Claims, 2 Drawing Sheets

SATELLITE ORBIT MAINTENANCE SYSTEM

This application is a continuation of application Ser. No. 07/571,508, filed Aug. 22, 1990, now abandoned.

BACKGROUND OF THE INVENTION

This invention relates generally to techniques for maintaining the orbits of earth-orbiting satellites and, more specifically, to techniques for maintaining such satellites in relatively low-altitude, nearly circular orbits. Some applications of satellite communications require the launching and maintenance of many satellites in low earth orbits.

The principal difficulty in maintaining a low earth orbit is that it is continuously degraded by atmospheric drag. The conventional process for overcoming drag involves tracking the satellite from the ground, determining the commands needed to raise the orbit, transmitting these commands to the satellite, and executing the commands on the satellite to effect a desired orbital correction. Because of the high cost and potential for error in this communication and computation process, orbital correct ion maneuvers are typically scheduled as infrequently as possible. As a result, orbit maintenance is not always performed in a most fuel-efficient manner, and the potential life of the satellite is not as long as it might be. Further, the total cost of maintaining a large constellation of satellites by this technique is prohibitively high for many applications.

Ideally, what is needed is a system for making orbital corrections on a more frequent and reliable basis, without the high cost and potential for catastrophic errors associated with ground-based control. The present invention satisfies this need.

SUMMARY OF THE INVENTION

The present invention resides in apparatus, and a corresponding method, for maintaining a satellite in an assigned low earth orbit without ground communication or intervention. Briefly, and in general terms, the apparatus of the invention comprises means located on the satellite for sensing the actual orbit of the satellite, orbit correction computation means, also located on the satellite, for periodically computing a velocity correction to be applied to the satellite, and means for applying the computed velocity correction via thrusters on the satellite, to effect an incremental velocity correction.

In the presently disclosed embodiment of the invention, the orbit correction computation means operates once per orbit, such as when the satellite crosses the ascending or descending node, i.e. crosses over the earth's equator. The means for applying the computed velocity correction also operates once per orbit, ideally at the next apogee point in the orbit after the point at which the computation is made, to raise and circularize the orbit.

More specifically, the orbit correction computation means includes means for computing an orbit error, defined as the difference between a measured time of passing a reference point in the orbit and a desired time of passing the same reference point. When the orbit error is within a predefined range, the velocity correction computed by the orbit correction computation means is equal to a predicted velocity correction needed to compensate for atmospheric drag in one complete revolution through the orbit. Although a single application of the predicted velocity correction is insufficient to make a detectable change in the orbit, repeated applications of this prediction-based velocity change keeps the satellite in its desired orbit with a minimum of fuel consumption.

For orbit error values outside the predefined range and in a direction indicative of a decaying orbit, the velocity correction is calculated by multiplying the orbit error value by a gain factor, to bring the satellite more quickly back into the acceptable predefined orbital error range. For orbit error values outside the predefined range and in a direction indicative of a rising orbit, the velocity correction is selected to be less than the prediction-based value, and may be zero, permitting the orbit to decay under the effect of atmospheric drag until the error value is again within the predefined range.

In terms of a novel method, the invention comprises the steps of sensing the actual orbit of the satellite using onboard sensing and navigation means, periodically computing, aboard the satellite, a velocity correction to be applied to the satellite, and applying the computed velocity correction to thrusters on the satellite, to effect an incremental velocity correction. Ideally, the computing step is performed once per orbit, at a defined reference point, and the step of applying the computed velocity correction is also performed once per orbit, preferably at apogee.

More specifically, the step of periodically computing includes computing an orbit error, defined as the difference between a measured time of passing a reference point in the orbit and a desired time for passing the same reference point. When the orbit error is within a predefined range, the velocity correction computed in the step of periodically computing is equal to a predicted velocity correction needed to compensate for atmospheric drag in one complete revolution through the orbit. For orbit error values outside the predefined range and in a direction indicative of a decaying orbit, the velocity correction is calculated by multiplying the orbit error value by a gain factor. For orbit error values outside the predefined range and in a direction indicative of a rising orbit, the velocity correction is selected to be less than the predicted value, and possibly zero, permitting the orbit to decay under the effect of atmospheric drag until the error value is again within the predefined range.

It will be appreciated from the foregoing that the present invention represents a significant advance in the field of spacecraft navigation and control. In particular, the invention provides for autonomous orbit maintenance of satellites using an efficient approach that provides for velocity corrections to be computed and executed, if necessary, on every revolution of the satellite about the earth. So long as the measured position of the satellite in its orbit falls within a positional "box" defining tolerance limits with respect to the desired orbital position, incremental velocity corrections are made based on a prediction of the effect of atmospheric drag on the satellite. If the measured satellite orbit continues to decay in spite of the incremental corrections, the magnitude of the corrections is increased when the measured orbit exceeds the tolerance limits. If the measured satellite orbit exceeds the tolerance limits in the other direction, and the incremental corrections result in a rising orbit, the magnitude of the corrections is reduced, and may be made zero, to permit atmospheric drag to reduce the orbit to the point that the orbital error falls within the tolerance "box" again.

Other aspects and advantages of the invention will become apparent from the following more detailed description, taken in conjunction with the accompanying drawings.

DESCRIPTION OF THE PREFERRED EMBODIMENT

Figure 1:
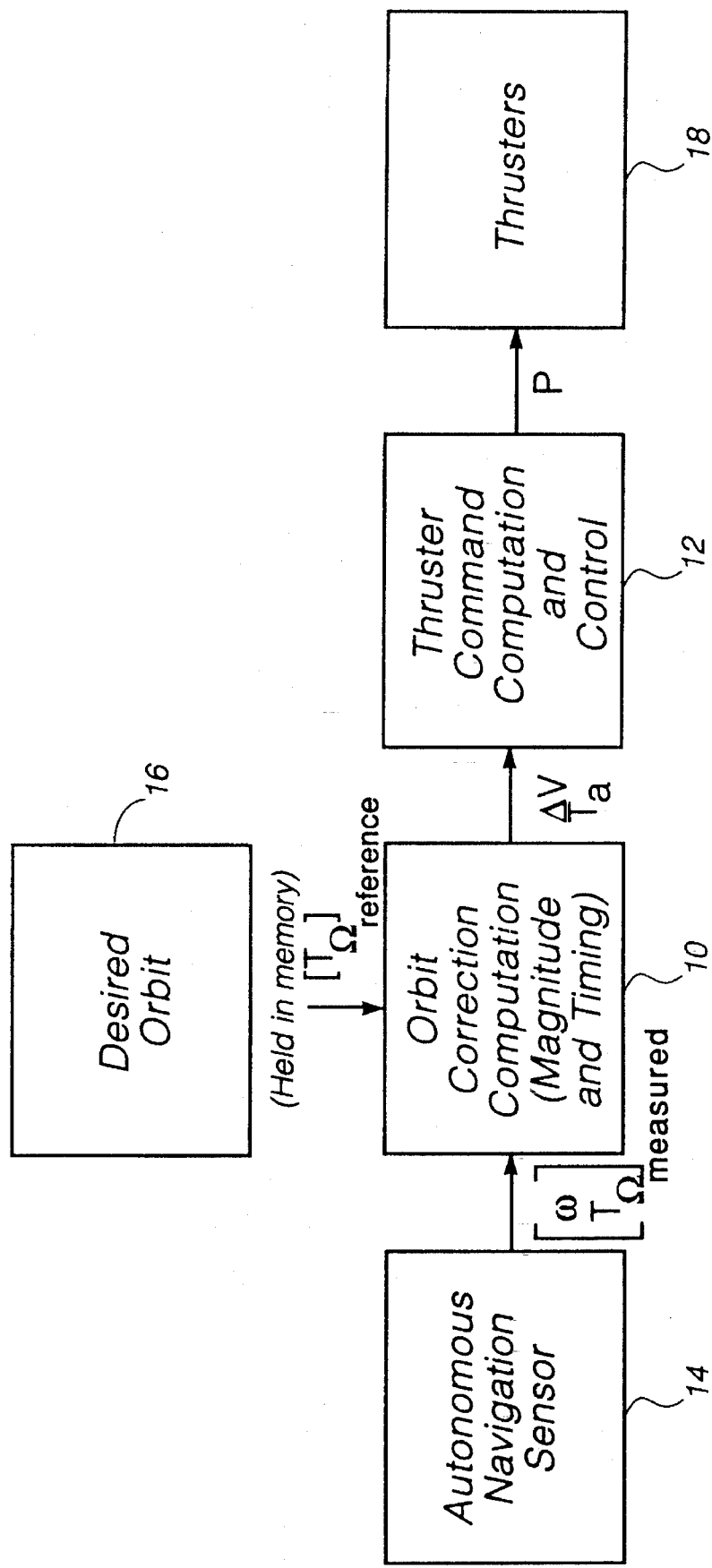
FIG. 1 is a block diagram of an autonomous orbit maintenance system in accordance with the invention.

As shown in the drawings for purposes of illustration, the present invention is concerned with a system for autonomously maintaining a satellite in a desired low-altitude, nearly circular, earth orbit. Although the system to be described operates autonomously in a single orbiting satellite, the invention may be used to advantage in the maintenance of a large constellation of satellites in assigned orbits providing worldwide communications coverage.

Conventionally, orbit maintenance has been performed from the ground by determining the present orbit of the satellite, computing a desired orbital correction, transmitting an orbital correction command to the satellite, and executing the command by firing thrusters on the satellite. Since this technique is relatively costly and is prone to error, orbital corrections are usually made very infrequently.

In accordance with the invention, an orbital correction computation is performed on the satellite, based on autonomous navigation data, and frequent periodic orbital corrections are made, without control or intervention from the ground. Other aspects of the invention will become apparent from the following discussion of the figures.

As shown in FIG. 1, the system of the invention includes an orbit correction computation module, indicated by reference numeral 10, and a thruster command computation and control module 12. The invention uses data from an autonomous navigation sensor 14, and parameters of a desired orbit, as indicated at 16, to compute a velocity correction, which the thruster command and computation control module converts to a pulse width for application to thrusters 18 aligned along a velocity vector of the satellite.

The desired orbit 16 is stored in memory when the satellite is launched, or may be subsequently changed under ground control, or by an autonomous system on board the satellite. For present purposes, however, the desired orbit is assumed to be fixed in satellite memory.

The autonomous navigation sensor 14 is an autonomous navigation device providing parameters that define the actual orbit of the satellite. Two alternatives are presently contemplated. One is to use the techniques described in pending patent application Ser. No. 07/473,715, entitled "Autonomous Spacecraft Navigation System," by James R. Wertz, assigned to the same assignee as the present application. Basically the techniques disclosed in this prior application involve using observations of the earth, sun and moon to determine spacecraft position and orbit. An alternative approach is to use signals received from multiple satellites in the Global Positioning System (GPS). The autonomous navigation sensor 14 is then basically a GPS receiver, various versions of which are commercially available. In any event, the sensor 14 provides parameters that define the observed orbit of the satellite, including $\omega$(measured), the argument of the perigee of the satellite orbit, and $T\Omega$(measured), the epoch of the ascending node of the orbit. The epoch time defines the time at which the satellite crosses the earth's equator from south to north. The $\omega$ parameter defines where in the orbit the perigee, or closest point to the earth, is reached. The argument of the perigee is the angle of arc, measured in the orbital plane, between the ascending node and the perigee, as seen from a focus of the orbit, which is near the center of the earth for nearly circular orbits.

The orbit correction computation module 10 uses these two orbital parameters provided from the autonomous navigation sensor 14, together with a desired epoch of the ascending node, $T\Omega$, and computes a velocity correction $\Delta V$ and an epoch $T_a$ for the apogee of the orbit, in a manner to be described in more detail. Signals indicative of these two values are passed to the thruster command computation and control module 12, which uses the values to compute a pulse width signal (PW) for control of the thrusters 18. This computation is well known in the art of rocket propulsion. There is a simple relationship between the performance characteristics of the thrusters, the mass of the satellite, and the "burn" time or pulse width needed to achieve a given change in satellite velocity.

In accordance with one important aspect of the invention, the orbit correction computation is performed (by module 10) once every satellite orbit, at the ascending node. If the module 10 determines that there should be a velocity correction, a correctional burn of the thrusters 18 is performed at the next apogee of the satellite, and therefore tends to raise and circularize the orbit. This provides eccentricity control at no additional cost.

The control system provided by the invention is a hierarchical architecture that uses an active closed orbit control loop around an internal predictive open loop. The fundamental control strategy is to control the phasing of the satellite in its orbit while maintaining the period and eccentricity. Control inputs are applied with the spacecraft thrusters 18, which change the spacecraft velocity by the commanded amount $\Delta V$. The magnitude of the applied $\Delta V$ controls the orbit semi-major axis, and thus the orbit period and spacecraft phasing. The time (orbit phase) at which $\Delta V$ is applied controls the orbit eccentricity. In the presently preferred embodiment of the invention, the $\Delta V$ control input is applied at the epoch of the apogee $T_a$.

The control system used in the invention is based on the observation that an orbiting satellite is a dynamic system with the characteristics of a restoring limit cycle. That is to say, the environment of the satellite acts on the energy state of the satellite in only one direction, to diminish the energy of the orbit and thus reduce the orbit period. Over successive orbits, the phase of the satellite with respect to any reference point moves forward, which means that the time epoch at which the satellite reaches a reference point in the orbit moves backward. This reduction of orbital energy is due to atmospheric drag. The control strategy is to add energy to the satellite by applying a control input $\Delta V$ whenever the phase of the vehicle moves past the reference phase point, and to let the environmental dynamics diminish the orbit energy whenever the phase of the vehicle falls behind the reference phase. An environmental $\Delta V$ moves the phase of the spacecraft forward, and moves backward the time epoch at which the satellite reaches a reference point in the orbit.

The reference state for the orbit control system is the epoch time at which the spacecraft passes a well known measured reference point in its orbit. The use of a reference epoch provides for direct control of the absolute phasing of the satellite in its orbit, and correspondingly, the relative phasing to other satellites in the constellation being controlled. For a spacecraft with a nonequatorial orbit, the ascending node provides an excellent phase reference. In the illustrative embodiment of the invention, the epoch $T_\Omega$ of the ascending node is used as the reference point.

As mentioned above, the computation of an orbit correction involves two control loops: a predictive inner loop and an active closed outer loop. The inner control loop applies $\Delta V$ control inputs to the orbiting spacecraft at levels below the sensing resolution of the navigation system. This is very desirable, as it provides incremental, low-level compensation for the losses in orbit energy due to atmospheric drag on the spacecraft. The control system applies a fixed $\Delta V$ equivalent to the energy loss due to drag. This predictive control is achievable because the drag diminishment of the orbit energy is well defined and may be modeled For example, the text "Spaceflight Dynamics," by William Wiesel (McGraw-Hill, 1989) derives an expression for velocity loss due to atmospheric drag. In particular, see equation 3.42 on page 83.

Figure 2:
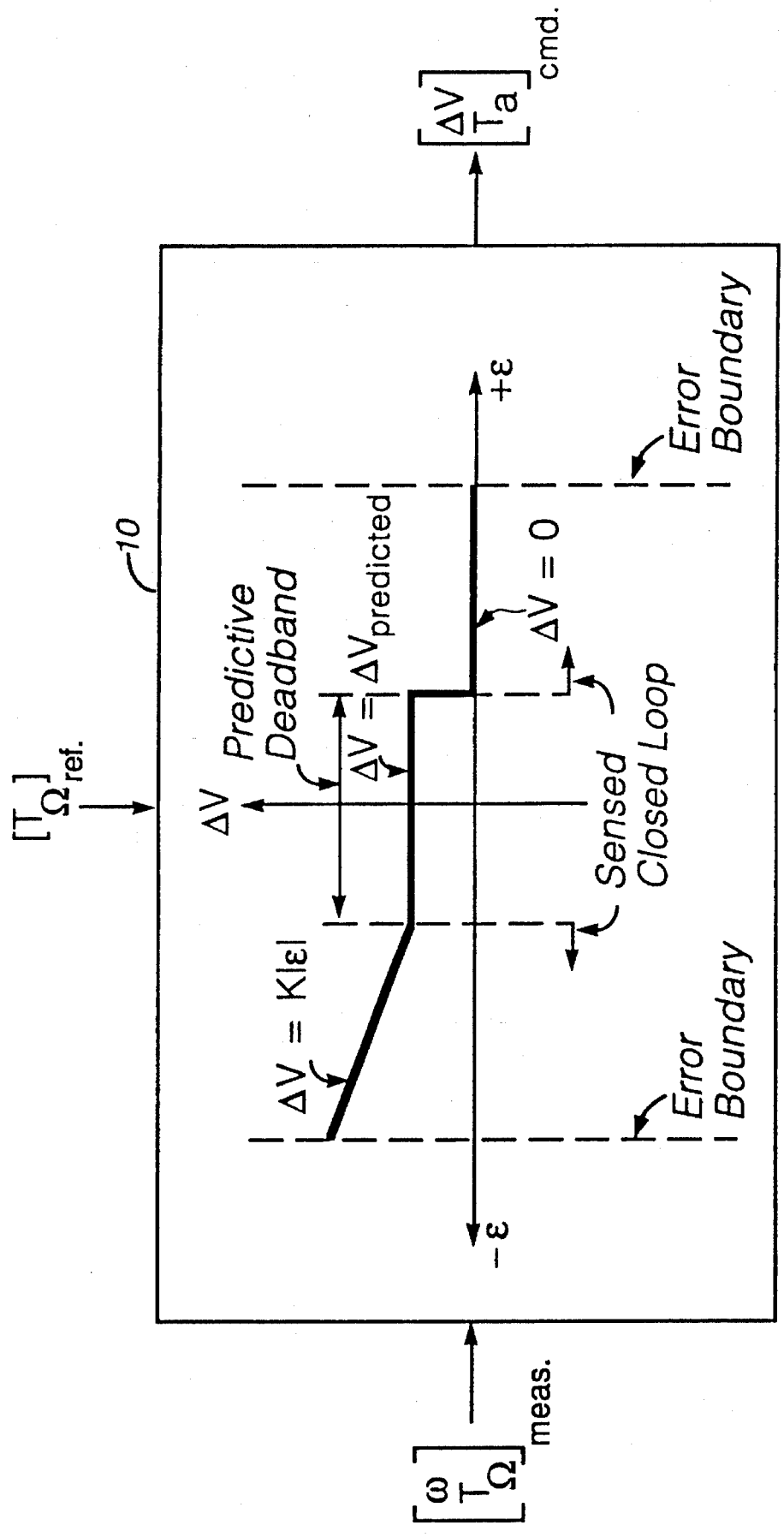
FIG. 2 is a diagrammatic view illustrating graphically how the orbit correction computation is performed in the system of the invention.

FIG. 2 shows, inside the block 10, a graph defining the relationship between the computed value of $\Delta V$ and the measured error $\epsilon$ in the epoch of the ascending node. The error is given by:

$$\epsilon = T_\Omega \text{ (measured)} - T_\Omega \text{ (reference)}.$$

For a central band of values of $\epsilon$, symmetrical about a zero value, the value of $\Delta V$ is obtained from a predicted value, based on a known model of the effect of atmospheric drag. The limits of the central band of error values are defined by the measurement resolution of the navigation system employed. Within this central deadband, the orbital errors are so small that they cannot be measured by the navigation system.

This inner predictive loop is bounded by the outer closed loop, which directly senses the orbit phase of the spacecraft, $T_\Omega$, and compares this with the reference phase. This difference is used as the error signal that drives the closed control loop. If the error signal is negative, indicating a drift through the one end of the predictive deadband, corresponding to a decaying orbit, the error signal is multiplied by a control gain K to determine the $\Delta V$ to be applied to null the phase error. The outer loop also utilizes the environmental restoring limit cycle to reduce propellant consumption. Thus, if the error is positive and outside the predictive deadband, a $\Delta V$ of zero is used, since the environmental effects of atmospheric drag will apply sufficient $\Delta V$ to compensate for the error and bring it back within the predictive deadband. Other control laws may be used in the outer active control loop. In general, though, the velocity correction will be increased to some degree on one side of the predictive deadband, and decreased to some degree on the other side.

A single application of the $\Delta V$ (predicted) used in the restrictive deadband is not sufficient to affect the orbit as observed by the autonomous navigation sensor 14, but repeated applications of the $\Delta V$ on each revolution of the satellite usually have a cumulative effect that is eventually recognized in the measured values of $T_\Omega$ and $\omega$. If the predicted effect of atmospheric drag is very accurate, the control system may remain in the central deadband for much of the time. To further improve the efficiency of the control system, the fixed velocity correction applied in the predictive deadband may be adjusted from time to time, based on the tendency of the system to move into the outer active control loop.

It will be appreciated from the foregoing that the present invention represents a significant advance in the field of spacecraft navigation and orbit maintenance. In particular, the invention provides for the autonomous maintenance of an assigned orbit, with no control or intervention from the ground, except to the extent that ground support may be needed for GPS position determination. The system of the invention eliminates the effects of possible communication errors during orbital corrections, and the need to store commands in the satellite. The invention also maximizes propellant efficiency and minimizes thruster size and weight for a given mission. For applications requiring large constellations of satellites, the system of the invention maintains tighter control over the constellation structure. Moreover, the potential for catastrophic error during a large thruster burn is practically eliminated, since all thruster burns are of short duration.

It will also be appreciated that, although an embodiment of the invention has been described in detail for purposes of illustration, various modifications may be made without departing from the spirit and scope of the invention. Accordingly, the invention is not to be limited except as by the appended claims.

I claim:

1. A control system for autonomously maintaining an earth-orbiting satellite in a desired orbit, the system comprising:

means located on the satellite for sensing successive positions of the satellite in its orbit and determining from the successive positions the actual orbit of the satellite;

orbit correction computation means, also located on the satellite, for periodically computing an orbital velocity correction to be applied to the satellite; and means for applying the computed orbital velocity correction to thrusters on the satellite, to effect an incremental orbital velocity correction;

wherein the orbit correction computation means includes means for computing an orbit error, defined as the difference between a measured time of passing a reference point in the orbit and a desired time of passing the same reference point; and wherein the orbit velocity correction computed by the orbit correction computation means when the orbit error is within a predefined range, is equal to a predicted velocity correction needed to compensate for atmospheric drag in one complete revolution through the orbit;

whereby orbital correction is effected even though each incremental velocity change may be insufficient to make a detectable change in the orbit.

2. The control system as defined in claim 1, wherein:

for orbit error values outside the predefined range and in a direction indicative of a decaying orbit, the orbital velocity correction is calculated by multiplying the orbit error value by a gain factor.

3. The control system as defined in claim 1, wherein:

for orbit error values outside the predefined range and in a direction indicative of a rising orbit, the orbital velocity correction is selected to be zero, permitting the orbit to decay under the effect of atmospheric drag, until the error value is again within the predefined range.

4. A computer implemented method for maintaining a satellite in a desired orbit, the method comprising the steps of:

sensing successive positions of the satellite in its orbit using onboard sensing and navigation means;

determining from the successive positions the actual orbit of the satellite;

periodically computing, on the satellite, an orbital velocity correction to be applied to the satellite; and applying the computed orbital velocity correction to thrusters on the satellite, to effect an incremental orbital velocity correction;

wherein the step of periodically computing includes computing an orbit error, defined as the difference between a measured time of passing a reference point in the orbit and a desired time for passing the same reference point; and wherein, when the orbit error is within a predefined range, the velocity correction computed in the step of periodically computing is equal to a predicted velocity correction needed to compensate for atmospheric drag in one complete revolution through the orbit;

whereby orbital correction is effected even though each incremental velocity change may be insufficient to make a detectable change in the orbit.

5. The computer implemented method as defined in claim 4, wherein:

for orbit error values outside the predefined range and in a direction indicative of a decaying orbit, the orbital velocity correction is calculated by multiplying the orbit error value by a gain factor.

6. The computer implemented method as defined in claim 4, wherein:

for orbit error values outside the predefined range and in a direction indicative of a rising orbit, the orbital velocity correction is selected to be zero, permitting the orbit to decay under the effect of atmospheric drag, until the error value is again within the predefined range.

7. The computer implemented method for maintaining a satellite in a desired orbit, the method comprising the steps of:

sensing successive positions of the satellite in its orbit using onboard sensing and navigation means;

determining from the successive positions the actual orbit of the satellite;

periodically computing, on the satellite, an orbital velocity correction to be applied to the satallite; and applying the computed orbital velocity correction to thrusters on the satellite, to effect an incremental orbital velocity correction;

wherein the step of determining the actual orbit of the satellite includes measuring the time at which the satellite passes a reference point in the orbit;

and wherein the step of periodically computing an orbital velocity correction is performed once for each orbit, at a selected reference point such as the crossing of a node;

and wherein the step of periodically computing includes determining whether an orbital error value defining the difference between the actual orbit and a desired orbit is within a predefined range;

if the orbital error value is within the predefined range, selecting the orbital velocity correction to be equal to a predicted value based on effects of atmospheric drag on the satellite;

if the orbital error value is outside the predefined range in a direction indicative of a decaying orbit, computing the orbital velocity correction to be greater than the predicted value used within the predefined range; and if the orbital error value is outside the predefined range in a direction indicative of a rising orbit, computing the orbital velocity correction to be less than the predicted value used within the predefined range.

8. The computer implemented method as defined in claim 7, wherein:

the orbital velocity correction for an orbital error outside of the predefined range in a direction indicative of a decaying orbit, is computed by multiplying the orbital error value by a gain factor; and the orbital velocity correction for an orbital error outside of the predefined range in a direction indicative of a rising orbit, is selected to be zero, to permit atmospheric drag to gradually change the orbital error until it falls within the predefined range.

9. A control system for maintaining an earth-orbiting satellite in a desired orbit, the system comprising:

means for sensing successive positions of the satellite in its orbit and determining from the successive positions the actual orbit of the satellite;

orbit correction computation means, for periodically computing a velocity correction to be applied to the satellite; and means for applying the computed velocity correction to thrusters on the satellite, to effect an incremental velocity correction;

wherein the orbit correction computation means includes means for computing an orbit error, defined as the difference between a measured time of passing a reference point in the orbit and a desired time of passing the same reference point;

and wherein the velocity correction computed by the orbit correction computation means when the orbit error is within a predefined range, is equal to a predicted velocity correction needed to compensate for atmospheric drag in one complete revolution through the orbit;

whereby orbital correction is effected even though each incremental velocity change may be insufficient to make a detectable change in the orbit.

10. The control system as defined in claim 9, wherein:

for orbit error values outside the predefined range and in a direction indicative of a decaying orbit, the velocity correction is calculated by multiplying the orbit error value by a gain factor.

11. The control system as defined in claim 10, wherein:

for orbit error values outside the predefined range and in a direction indicative of a rising orbit, the velocity correction is selected to be zero, permitting the orbit to decay under the effect of atmospheric drag, until the error value is again within the predefined range.

12. The control system as defined in claim 9, wherein:

the orbit correction computation means operates once per orbit; and the means for applying the computed velocity correction also operates once per orbit.

13. The control system as defined in claim 12, wherein:

the orbit correction computation means operates each time the satellite passes through an ascending or descending node;

the means for applying the computed velocity correction operates at each apogee of the orbit, to raise and circularize the orbit.

14. A computer implemented method for maintaining a satellite in a desired orbit, the method comprising the steps of:

sensing successive positions of the satellite in its orbit using sensing and navigation means;

determining from the successive positions the actual orbit of the satellite;

periodically computing a velocity correction to be applied to the satellite; and applying the computed velocity correction to thrusters on the satellite, to effect an incremental velocity correction;

wherein the step of periodically computing includes computing an orbit error, defined as the difference between a measured time of passing a reference point in the orbit and a desired time for passing the same reference point;

and wherein, when the orbit error is within a predefined range, the velocity correction computed in the step of periodically computing is equal to a predicted velocity correction needed to compensate for atmospheric drag in one complete revolution through the orbit;

whereby orbital correction is effected even though each incremental velocity change may be insufficient to make a detectable change in the orbit.

15. The computer implemented method as defined in claim 14, wherein:

for orbit error values outside the predefined range and in a direction indicative of a decaying orbit, the velocity correction is calculated by multiplying the orbit error value by a gain factor.

16. The computer implemented method as defined in claim 15, wherein:

for orbit error values outside the predefined range and in a direction indicative of a rising orbit, the velocity correction is selected to be zero, permitting the orbit to decay under the effect of atmospheric drag, until the error value is again within the predefined range.

17. The computer implemented method as defined in claim 14, wherein:

the step of determining the actual orbit of the satellite includes measuring the time at which the satellite passes a reference point in the orbit;

the step of periodically computing a velocity correction is performed once for each orbit, at a selected reference point such as the crossing of a node;

the step of periodically computing includes
determining whether an orbital error value defining the difference between the actual orbit and a desired orbit is within a predefined range;

if the orbital error value is within the predefined range, selecting the velocity correction to be equal to a predicted value based on effects of atmospheric drag on the satellite;

if the orbital error value is outside the predefined range in a direction indicative of a decaying orbit, computing the velocity correction to be greater than the predicted value used within the predefined range; and if the orbital error value is outside the predefined range in a direction indicative of a rising orbit, computing the velocity correction to be less that the predicted value used within the predefined range.

18. The computer implemented method as defined in claim 17, wherein:

the velocity correction for an orbital error outside of the predefined range in a direction indicative of a decaying orbit, is computed by multiplying the orbital error value by a gain factor; and the velocity correction for an orbital error outside of the predefined range is a direction indicative of a rising orbit, is selected to be zero, to permit atmospheric drag to gradually change the orbital error until it falls within the predefined range.

19. The computer implemented method as defined in claim 14, wherein:

the computing step is performed once and the step of applying the computed velocity correction is also performed once per orbit.

20. The computer implemented method as defined in claim 19, wherein:

computing step is performed each time the satellite passes through an ascending or descending node;

the step of applying the computed velocity correction operates at each apogee of the orbit, to raise and circularize the orbit.

* * * * *

UNITED STATES PATENT AND TRADEMARK OFFICE
CERTIFICATE OF CORRECTION

PATENT NO. : 5,528,502
DATED : June 18, 1996
INVENTOR(S) : James R. Wertz

It is certified that error appears in the above-identified patent and that said Letters Patent is hereby corrected as shown below:

In column 1, line 22 the words "correct ion" should be -- correction --.

In column 10, line 27 (claim 19, line 3) after "once" insert -- per orbit; --.

Signed and Sealed this

Twenty-fifth Day of May, 1999

Attest:

Q. TODD DICKINSON

Attesting Officer      Acting Commissioner of Patents and Trademarks